United States Patent
Bouman

(10) Patent No.: US 9,248,753 B2
(45) Date of Patent: Feb. 2, 2016

(54) METHOD, SYSTEM AND DEVICE FOR CHARGING AN ELECTRIC VEHICLE

(75) Inventor: Crijn Bouman, The Hague (NL)

(73) Assignee: ABB B.V., Rotterdam (NL)

( * ) Notice: Subject to any disclaimer, the term of this patent is extended or adjusted under 35 U.S.C. 154(b) by 200 days.

(21) Appl. No.: 13/991,310

(22) PCT Filed: Dec. 5, 2011

(86) PCT No.: PCT/NL2011/050831
§ 371 (c)(1),
(2), (4) Date: Aug. 15, 2013

(87) PCT Pub. No.: WO2012/074406
PCT Pub. Date: Jun. 7, 2012

(65) Prior Publication Data
US 2013/0314043 A1      Nov. 28, 2013

(30) Foreign Application Priority Data

Dec. 3, 2010    (NL) ..................................... 2005816

(51) Int. Cl.
*H02J 7/00*      (2006.01)
*B60W 10/24*   (2006.01)
(Continued)

(52) U.S. Cl.
CPC ......... *B60L 11/1838* (2013.01); *B60L 11/1844* (2013.01); *H02J 7/0073* (2013.01);
(Continued)

(58) Field of Classification Search
CPC ......... H02J 7/00; H02J 7/0073; B60W 10/24; B60W 20/08; B60K 1/00; B60K 16/00; B60L 8/00; B60L 11/1844; B60L 11/1838; Y02T 10/7005; Y02T 10/70005; Y02T 10/126; Y02T 90/121; Y02T 90/128; Y02T 90/163; Y02T 90/14; Y04S 30/12; Y02E 60/721
USPC .................... 320/109, 104; 180/65.29, 65.31; 307/150
See application file for complete search history.

(56) References Cited

U.S. PATENT DOCUMENTS 5,594,318 A * 1/1997 Nor et al. ....................... 320/108
5,689,825 A * 11/1997 Averbuch et al. .............. 455/418
(Continued)

FOREIGN PATENT DOCUMENTS

DE    39 02 339 A1    8/1990
DE    10 2009 019 753 A1    11/2010
EP    1 455 431 A2    9/2004

OTHER PUBLICATIONS

International Search Report (PCT/ISA/210) issued on Feb. 15, 2013, by the Dutch Patent Office as the International Searching Authority for International Application No. PCT/NL2011/050831.
(Continued)

*Primary Examiner* — Phallaka Kik
(74) *Attorney, Agent, or Firm* — Buchanan Ingersoll & Rooney PC

(57)   ABSTRACT

A method is disclosed for charging an electric vehicle, which includes determining a suitable charge algorithm for charging the electric vehicle, providing the charger with the algorithm and charging the electric vehicle according to the algorithm. A charger for an electric vehicle can be configured to have an updatable charging algorithm set, such as a charger configured for receiving and executing charging algorithms in the form of an executable script. Parameters for the charging algorithm may be received from a different source than the algorithm.

19 Claims, 10 Drawing Sheets

(51) Int. Cl.
*B60K 1/00* (2006.01)
*B60K 16/00* (2006.01)
*B60L 8/00* (2006.01)
*B60L 11/00* (2006.01)
*B60L 11/18* (2006.01)

(52) U.S. Cl.
CPC .............. *B60W 10/24* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS

| | | | |
|---|---|---|---|
| 5,803,215 A * | 9/1998 | Henze et al. | 191/2 |
| 6,331,762 B1 * | 12/2001 | Bertness | 320/134 |
| 6,483,272 B1 | 11/2002 | Terada et al. | |
| 8,232,763 B1 * | 7/2012 | Boot | 320/107 |
| 2003/0102845 A1 * | 6/2003 | Aker et al. | 320/139 |
| 2005/0088144 A1 * | 4/2005 | Pacholok et al. | 320/131 |
| 2008/0079374 A1 | 4/2008 | Wobben | |
| 2008/0136371 A1 * | 6/2008 | Sutardja | 320/109 |
| 2009/0001928 A1 * | 1/2009 | Fee et al. | 320/106 |
| 2010/0016034 A1 * | 1/2010 | Lindqvist et al. | 455/573 |
| 2010/0114798 A1 | 5/2010 | Sirton | |
| 2010/0161482 A1 | 6/2010 | Littrell | |
| 2010/0256830 A1 * | 10/2010 | Kressner et al. | 700/291 |
| 2010/0270980 A1 * | 10/2010 | Newhouse et al. | 320/152 |
| 2010/0283432 A1 * | 11/2010 | Ellwanger et al. | 320/155 |
| 2011/0015799 A1 * | 1/2011 | Pollack et al. | 700/291 |
| 2011/0169459 A1 * | 7/2011 | Chen et al. | 320/160 |
| 2011/0213656 A1 * | 9/2011 | Turner | 705/14.49 |
| 2012/0013300 A1 * | 1/2012 | Prosser et al. | 320/109 |
| 2012/0112694 A1 | 5/2012 | Frisch et al. | |
| 2012/0130556 A1 * | 5/2012 | Marhoefer | 700/291 |
| 2012/0143383 A1 * | 6/2012 | Cooperrider et al. | 700/295 |
| 2012/0146583 A1 * | 6/2012 | Gaul et al. | 320/109 |
| 2013/0184886 A1 * | 7/2013 | Pollack et al. | 700/291 |

OTHER PUBLICATIONS

Written Opinion (PCT/ISA/237) issued on Feb. 15, 2013, by the Dutch Patent Office as the International Searching Authority for International Application No. PCT/NL2011/050831.

International Preliminary Report on Patentability (PCT/IPEA/409) issued on Apr. 16, 2013, by the Dutch Patent Office as the International Searching Authority for International Application No. PCT/NL2011/050831.

Search Report (Form PCT/ISA/201 A) and the Written Opinion (Forms NL237A, NL237B, and NL237-3) issued on Jul. 28, 2011, in corresponding Netherlands Application No. 2005816. (9 pages).

* cited by examiner

SITUATION A

SITUATION B

SITUATION C

SITUATION D

METHOD, SYSTEM AND DEVICE FOR CHARGING AN ELECTRIC VEHICLE

FIELD

The present invention relates to a method, system and device for charging an electric vehicle, in particular a battery thereof.

BACKGROUND

It is well known to charge batteries of electric vehicles with the aid of chargers, and also to make use of charging algorithms, that prescribe charging currents and voltages as a function of time and other parameters.

EP 1 455 431 relates to an on-board charger in which the specific technical difficulties that arise when a charger needs to be able to charge different vehicles under various circumstances do not occur.

U.S. Pat. No. 6,483,272 relates to an on board bicycle battery.

US 2010/161482 relates to a billing system.

Some chargers even offer the possibility to choose between multiple charging algorithms that are optimised for different situations or batteries.

However, these optimisations are done upfront, in particular when the charger is manufactured. This has several disadvantages. The charger may not comprise optimal algorithms for the actual situations it is used in, or the situation and circumstances may change, or better algorithms may be developed after manufacture of the charger.

These disadvantages take place for off-board chargers, that is, chargers that are not arranged on-board of a vehicle, and adapted to said vehicle or its battery, but rather at a charge station. These chargers are not optimised for one specific vehicle or battery, but need to be able to meet the requirements of various vehicle types arriving to be charged at the charge station. The present invention relates to off-board chargers for use at a charging station, and in particular, chargers having multiple power exchange ports for charging multiple vehicles at a time.

SUMMARY

It is a goal of the present invention to provide a solution for the above-mentioned disadvantages. In general, it is a further goal of the present invention to provide a useful alternative to methods, systems and devices for charging electric vehicles according to the art.

The invention thereto proposes a method for charging an electric vehicle, comprising the steps of determining a suitable charge for charging the electric vehicle, providing the charger and/or the vehicle with the algorithm, and charging the electric vehicle according to the algorithm.

Here, a charge algorithm is to be understood as a procedure that controls the charging operation of the charger dependent on charge parameters like voltage, current, time and temperature. Example of a charge algorithm is charging with a constant current until a voltage threshold of the battery is reached, and then charging with a constant voltage during a predetermined time. Another algorithm could be pulsed charging. The best charge algorithm and/or the charge parameters for a situation, is depending on parameters like grid power availability, requests or suggestions by the electric vehicle, price and demand on other charging ports or charging ports on other chargers in the vicinity the of the actual charger.

The charger may be a direct current charger, an alternating current charger, an inductive charger or any combination thereof. According to the present invention, the charger and and in some specific embodiments also the electric vehicle should be adapted to be able to receive algorithms, and store algorithms locally. An updatable and/or accessible memory or data storage means should thereto be available. It is preferred that the charger and the electric vehicle comprise communication means via which the algorithms and parameters can be provided. These communication means can be wireless means, or wired means, for example integrated in a cable for charging an electric vehicle. The protocol that is used for the interaction between the server, charger and the electric vehicle may be adapted for sending and receiving algorithms and parameters.

The present invention herewith provides the advantage that algorithms can be updated or replaced remotely. A charger can be upgraded with the latest charge algorithms. An electric vehicle can also be upgraded with latest charge algorithms, which can then use these optimal algorithms when charging at more primitive charging stations. In the end, an extended battery life may be the goal of the invention.

In an embodiment, the method comprises providing the charger and/or the electric vehicle with parameters for use with the algorithm. These parameters may for example be maximum currents or voltages of the battery and/or vehicle, or parameters relating to the grid or to other electric vehicles at the charging location.

It is also possible that parameters are embedded in the algorithms, and uploaded to the charger and/or electric vehicle along with the algorithm. This is especially advantageous when the parameters are optimised parameters for a specific algorithm.

It is also thinkable that the parameters are provided from a different location than the algorithm itself. For example, the algorithm is sent to the charger from a central database, while the parameters are derived from an onboard controller, memory or data storage of the electric vehicle.

In general, the method according to the present invention may comprise reading the algorithm and/or parameters from a database in a data-network that comprises the charger. This database may be a central database, on a server that is part of a network the charger forms part of too, or at least a network the charger can connect to.

In another embodiment, it is thinkable that the algorithm and/or parameters are read from a database or memory in the electric vehicle to be charged. For that purpose the method according to the invention may comprise the step of uploading algorithms into a controller of an electric vehicle, for controlling a charger that charges the electric vehicle. Thereto, a central server may comprise actual charging algorithms, which are sent via a data-connection of a charging station, when the electric vehicle is being charged at a charger that forms part of a network that also comprises the central server. It should be noted here that the term "central server" may also comprise multiple (interconnected) servers or databases, or cloud computing configurations.

In a further embodiment, the method may comprise providing the algorithm in the form of a computer readable script, wherein the electric vehicle is charged by executing the script in the controller, which is aboard a charger, or an electric vehicle. A charger and electric vehicle according to the invention is thereto configured to receive and execute charging algorithms in script form.

The charge algorithm may be based on external parameters such as grid power availability, requests or suggestions by the vehicle, price and demand on other charging ports of the same charger, or price or demand on charging ports of another charger.

In an embodiment the algorithm is transmitted in encrypted form to the vehicle, the decryption key can then be delivered separately via wired, wireless (GPRS) or manual means. The algorithm can also be forced to execute on the vehicle, for example in case of robbery the vehicle is forced to run a slow charging algorithm.

The charger as intended in the present invention can be a so-called DC charger where the charger comprises one or more converters which can convert AC power from the Grid to DC and feed this DC power directly into the vehicle. The algorithm may influence or control the power delivery of the AC-DC converter inside the charger (voltage, current) to generate a certain charge profile.

The charger can also be a AC charge system which supplies an AC current to the vehicles. In this case the vehicle will contain some kind of AC-DC conversion device. In this embodiment the algorithm may influence the power delivery of the AC-DC conversion device inside the vehicle to generate a certain charge profile.

In another embodiment the system may be a so-called inductive charge system, where the power is transferred via an inductive system. In this case, generally, the power is transferred via a power conversion system inside the charger and a first coil connected to the charger to a second coil which is part of the vehicle. In this case the algorithm may influence the power delivery of the power conversion system and first coil to generate a certain charge profile.

Resumingly, the invention provides the advantages that algorithms in the charger can be updated or changed remotely, that the controller aboard the vehicle can be upgraded with the latest algorithms and use these optimal algorithms when charging at more primitive chargers, extending the battery-life, and because of the memory in the charger, it can store a library of algorithms, preventing that the entire algorithm has to be transmitted every time a new vehicle is connected to the charger.

BRIEF DESCRIPTION OF THE DRAWINGS

The invention will now be explained into more detail with reference to the following figures, wherein.

DETAILED DESCRIPTION

Figure 1:
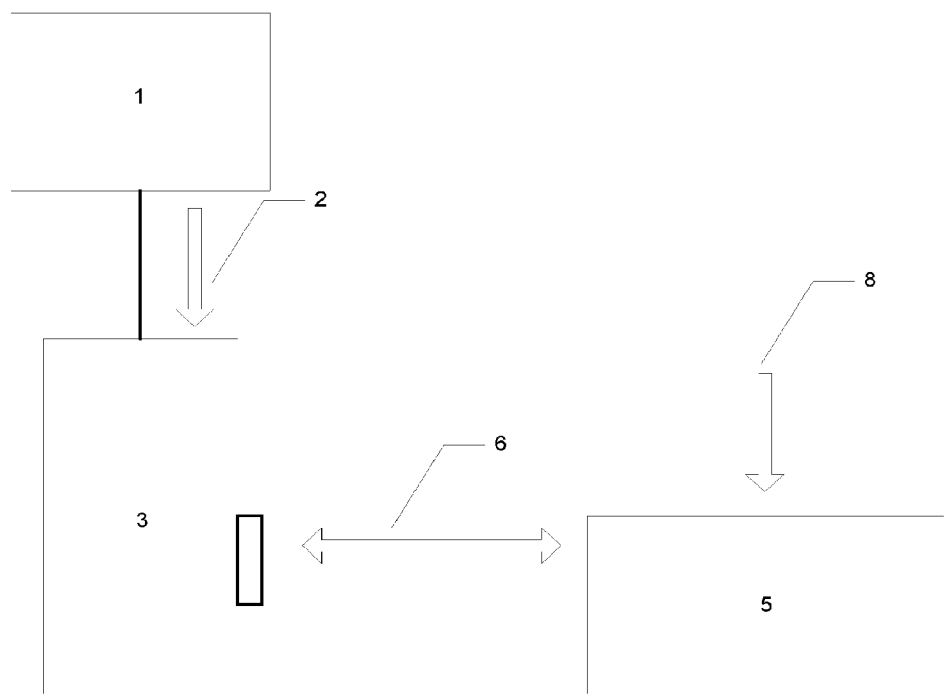
FIG. 1 shows a schematic view of a charging situation in the prior art.

FIG. 1 shows the prior art, a remote element embodied by a (central) server 1 which can contain algorithms for charging or decision-making, a charger 3 which receives parameters 2 from the server 1 and uses these parameters 2 to charge the electric vehicle 5. When a vehicle 5 connects to the charger 3, parameters 6 are exchanged between the charger 3 and the electric vehicle 5 before the charging starts and during the charging. The communication between the charger and vehicle is governed by the charging control protocol, which is a limiting factor in the transfer of data between the charger and the vehicle. One example could be the charge control protocol which to date allows only the transfer of parameters. The electric vehicle 5 may also receive parameters 8 via local input means.

Figure 2A:
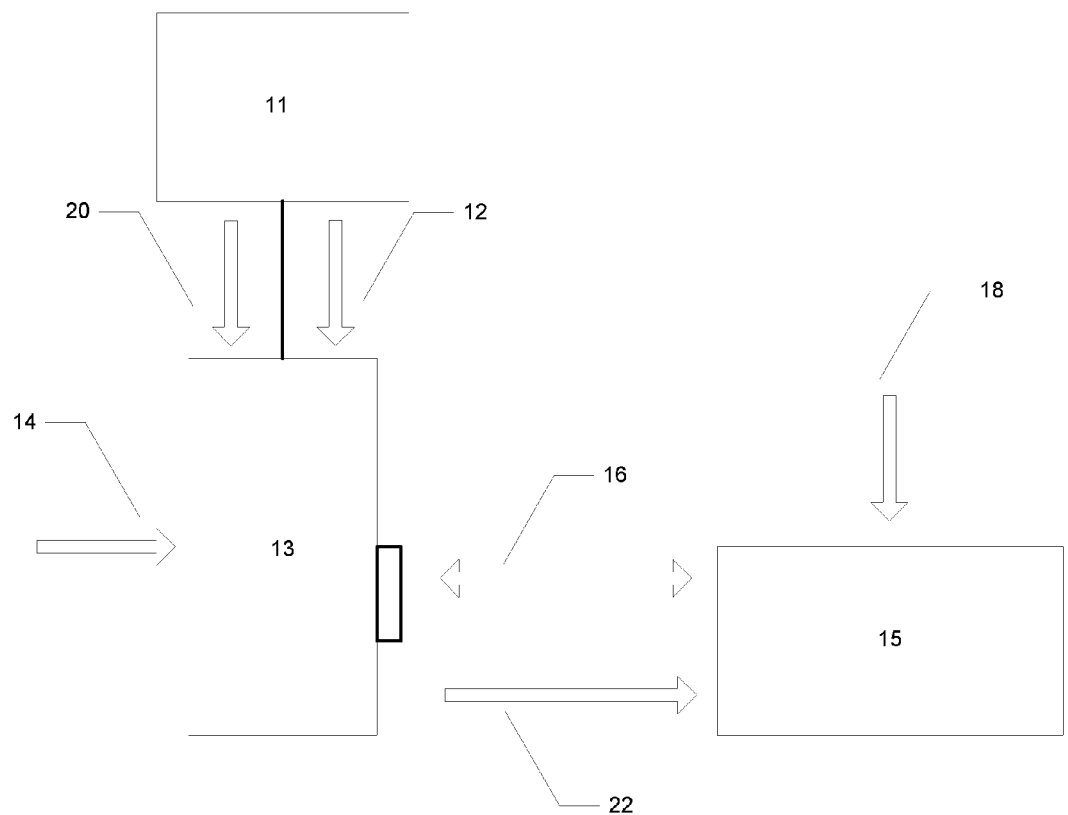
FIG. 2a-2b shows the schematic view of two charging situations in the present invention.

FIG. 2a shows an embodiment of the present invention, a remote element embodied by a (central) server 11 which can contain algorithms for charging or decision making, a charger 13 with modified firmware to receive or transmit algorithms 20 from the server 11 and uses these algorithms 20 with parameters 12 to charge the electric vehicle 15. In a more advanced configuration it is also possible to upload algorithms 22 from the charger 13 to an electric vehicle 15 with modified firmware to receive algorithms 22. Before the charging starts parameters 16 are exchanged between the charger 13 and the electric vehicle 15. The electric vehicle 15 and the charger 13 may also receive parameters (14, 18) via local input means.

Figure 2B:
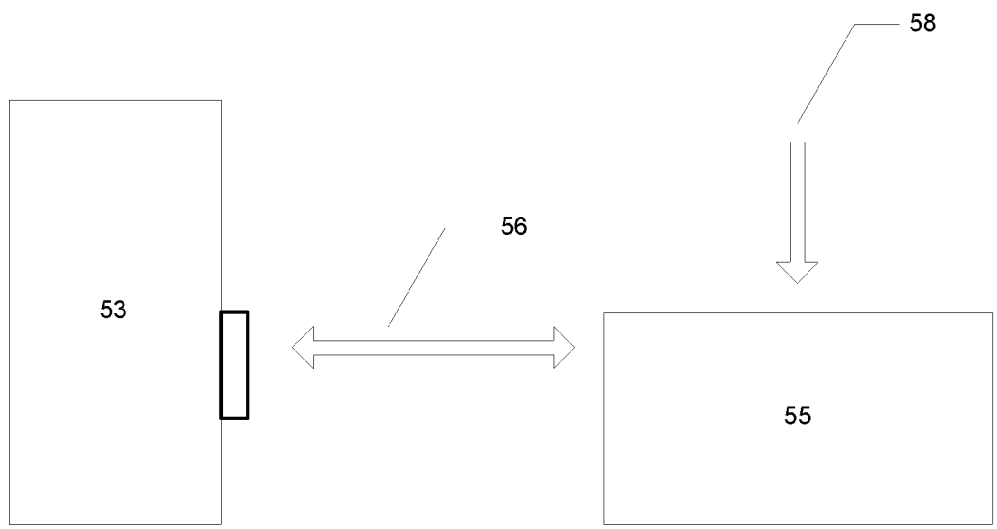

FIG. 2b shows a case wherein the electric vehicle 55 has received an algorithm in an earlier charge session (for example from charger 33 in FIG. 2a of the previous example). This algorithm stored in the vehicle can now be used to control the charger 53 it is connected to, or any other charger from a third party which is configured to allow the electric vehicle to take control over the charging process. Before the charging starts parameters 56 are exchanged between the charger 53 and the electric vehicle 55. The electric vehicle 55 and the charger 53 may also receive parameters 58 via local input means. This concept can also be applied to other decision-taking moments or entities in chargers, such as deciding whether maintenance is necessary and calling for it.

Figure 3:
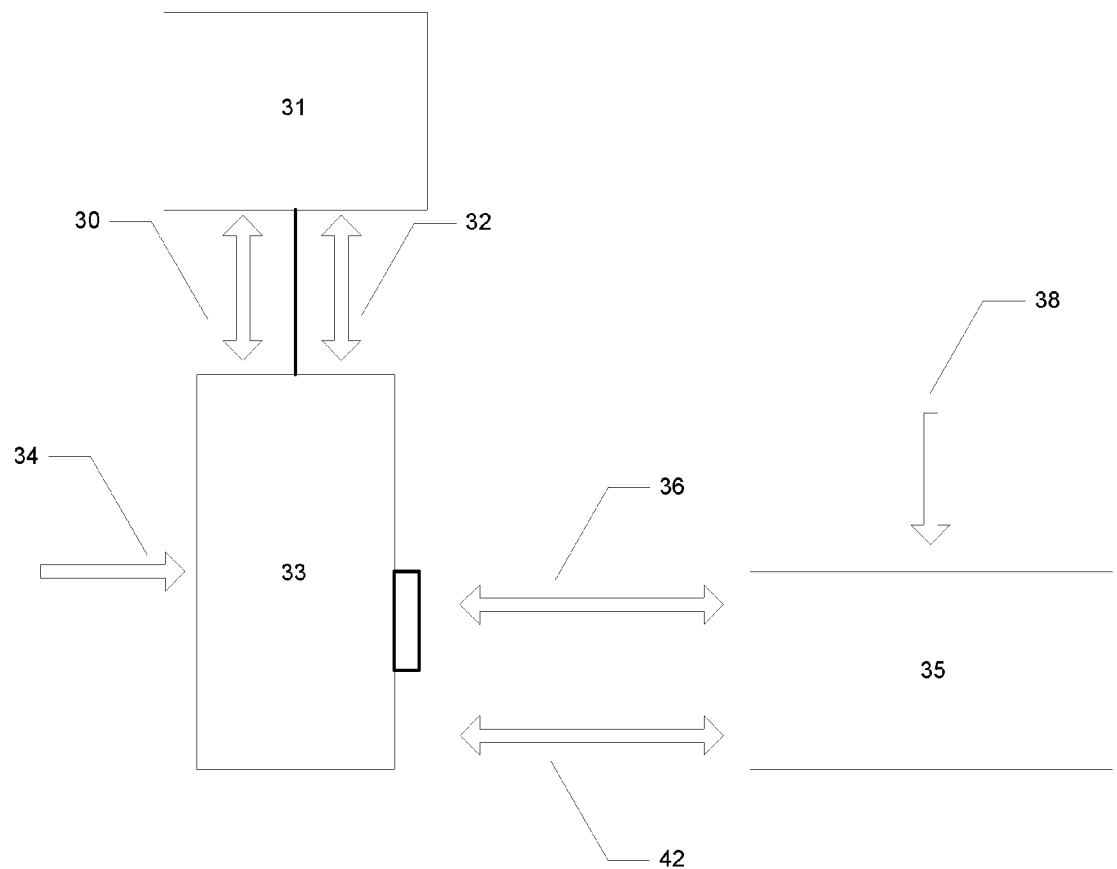
FIG. 3 shows the schematic view of another charging situation in the present invention.

FIG. 3 shows a case wherein it is not only possible to send parameters 32 and/or algorithms 30 from the server 31 to the charger 33 and charger 33 to the electric vehicle 35, but also from the electric vehicle 35 to the charger 33 and from the charger 33 to the server 31, or parameters 34 from a local infrastructure to the charger 33. Furthermore, parameters 36 and algorithms 42 may be exchanged between the charger 33 and the electric vehicle.

In an embodiment the algorithms can be sent to the electric vehicle 35 or to the server 31 (e.g. or auxiliaries) as a piece of (preferably executable) code (e.g. complete charger software, a patch) for example binary code, Java, Java byte code, C-code, a Library, or a programming language or language derived from a programming language. The algorithm can also be a script, for example a linear script with jumps.

The algorithm can be a finite state machine that is defined by a set of numbers, and/or it can be executed or interpreted on the fly or compiled to another form that can be executed or interpreted. The algorithm may need an instruction set, such as "set charge current to value x".

These charge parameters like "value x" can be embedded in the algorithm. For example parameters that define a safe operation area can be part of the algorithm, rather of the charge parameter set that is used in combination with the charge algorithm. A benefit hereof is that the safety is maintained even if the script encounters an error such as a deadlock, undefined state of infinite loop.

The algorithm can also include functions or an extended instruction set that helps to keep the algorithm itself universal. For example, the maximum cell voltage from a battery pack can be provided by the battery pack itself or it can be that the battery pack provides all cell voltages and the charger needs to search the highest value in that array to get the highest cell voltage. This can be done in the script, but also in a different section, which cleans up the charge algorithm from such auxiliary functions.

The control of certain charge parameters can be a challenge. Some control needs to be fast, such as reacting on a high voltage, whereas other control can be slow such as reacting on temperature. It can be that these different types of control are in the charge script, but also it can be that they are in different locations. For instance a constant voltage algorithm can be a part of the charger, so that a charger can be directly controlled on voltage, but it can also be a part of the aforementioned globals, instruction set or functions header. It can be that a certain control is spread over these locations. For example a control can have a small and large control loop. The small control loop (e.g. keeping the current within a margin of a set value) can be part of the charger, whereas the large control loop (e.g. changing the current-set value as a function of the temperature) can be in the script in the electric vehicle.

The charge algorithm can be rule based, which means that the relation of the charge parameters is given in the algorithm file (logic programming). This method requires a solver that solves the equations to get to the correct result.

In an embodiment the electric vehicle 35 has decision algorithms on how to control the charging process (i.e. charge algorithm), which can be updated from the charger or through the charger from the remote server. The charger 33 has decision algorithms on how much power is available based on grid availability, requests or suggestions by the vehicle, price and demand on other charging ports or charge ports at charge stations in the vicinity of this charger. Between the charger 33 and the vehicle 35 there is a negotiation process that can be handled by the decision algorithms in the charger and the vehicle.

Figure 4:
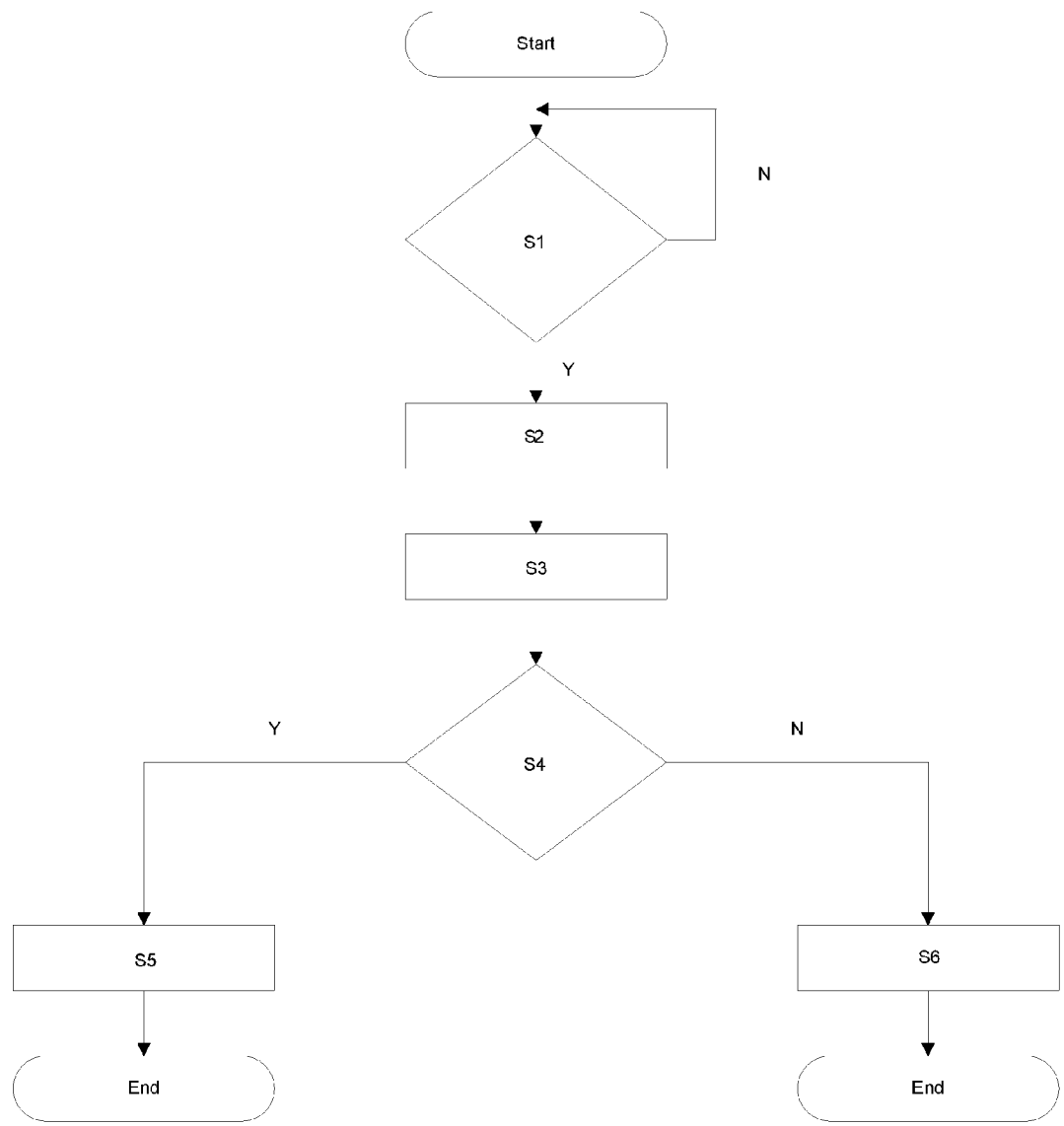
FIG. 4 shows a flowchart of a possible decision algorithm.

FIG. 4 shows a flowchart of a possible decision algorithm that could be used within the present invention. The algorithm illustrated in FIG. 4 may be implemented in hardware, software or firmware or a combination thereof. In step S1 the charger determines if one or more vehicles are connected to the charger. If vehicles are connected to the charger, the battery data is determined in step S2. Next, in step S3 the maximum available grid power is determined. In step S4 the available grid power is compared with the total power demanded by the vehicles. If the available grid power is lesser than the total power demanded by the vehicles, the control moves to S5 and charge algorithm A is executed. Else control moves to step S6 and charge algorithm B is executed.

Figure 5:
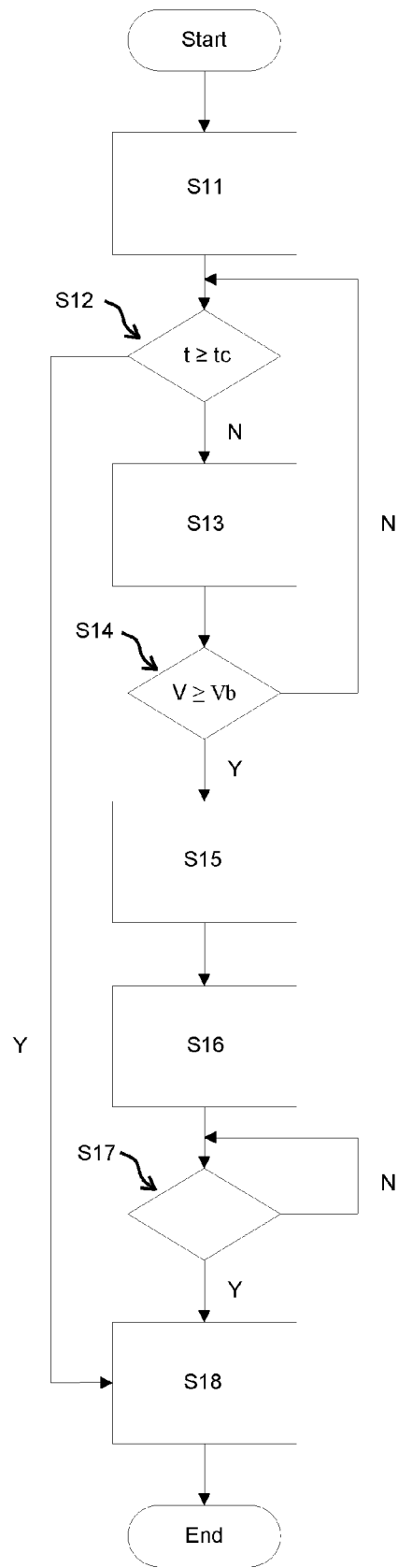
FIG. 5 shows a flowchart of a possible charge algorithm.

FIG. 5 shows a flowchart of a possible charge algorithm that could be used within the present invention. The flowchart is explained in the following with reference to the waveforms of FIGS. 7A-7B.

[Step S11] The charger starts charging the vehicle with a constant current (given by Ia and Id in FIGS. 7A-7B). Control moves to the next step unconditionally.

[Step S12] While the charging with constant current is continuing, the elapsed time is compared with the set maximum charge time (given by tc and tf in FIGS. 7A-7B). If the elapsed time is greater than or equal to the maximum charge time, the control moves to step S18 and the total charging process is terminated. Else the control moves to the next step.

[Step S13] The battery voltage is measured. Control moves to the next step unconditionally.

[Step S14] The battery voltage is compared with the set maximum voltage (given by Vb and Ve in FIGS. 7A-7B). If the battery voltage is greater than or equal to the threshold voltage the control moves to the next step, else the control loops to step S12.

[Step S15] Constant current charging is terminated. Control moves to the next step unconditionally.

[Step S16] The charger starts charging the vehicle with the set maximum voltage (given by Vb and Ve in FIGS. 7A-7B). Control moves to the next step unconditionally.

[Step S17] The charger continues charging the vehicle with the set maximum voltage until the maximum charge time (given by tc and tf in FIGS. 7A-7B) has elapsed. The control moves then to the next step.

[Step S18] The total charging process is terminated.

Figure 6:
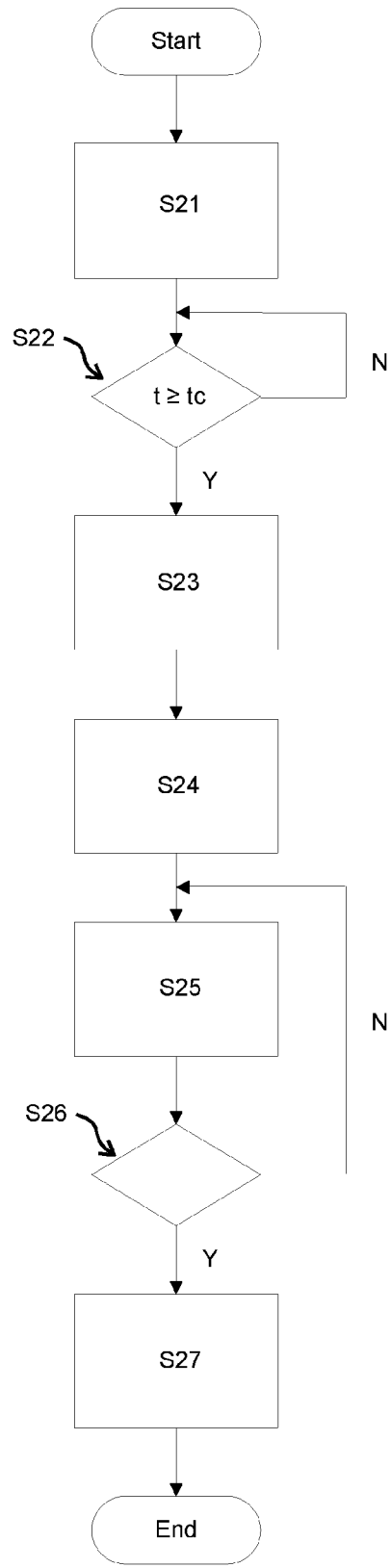
FIG. 6 shows another flowchart of a possible charge algorithm.

FIG. 6 shows another flowchart of a possible charge algorithm that could be used within the present invention. The flowchart is explained in the following with reference to the waveforms of FIGS. 7C-7D.

[Step S21] The charger starts charging the vehicle with a constant voltage (given by Vb and Ve in FIGS. 7C-7D). Control moves to the next step unconditionally.

[Step S22] The charger continues charging the vehicle with constant voltage until the maximum charge time (given by tc and tf in FIGS. 7C-7D) has elapsed. The control moves then to the next step.

[Step S23] Constant voltage charging is terminated. Control moves to the next step unconditionally.

[Step S24] The charger starts charging the vehicle with a constant current (given by Ia and Id in FIGS. 7C-7D). Control moves to the next step unconditionally.

[Step S25] The battery voltage is measured. Control moves to the next step unconditionally.

[Step S26] The battery voltage is compared with the set maximum voltage (given by Vb and Ve in FIGS. 7C-7D). If the battery voltage is greater than or equal to the threshold voltage the control moves to the next step, else the control loops to step S25.

[Step S27] The total charging process is terminated.

Figure 7:
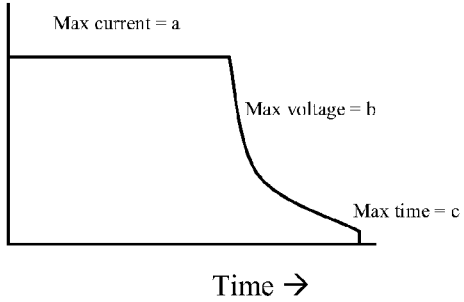
FIG. 7a-d shows graphs of four possible charge algorithms.
Figure 7:
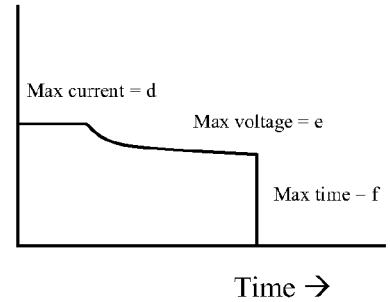
Figure 7:
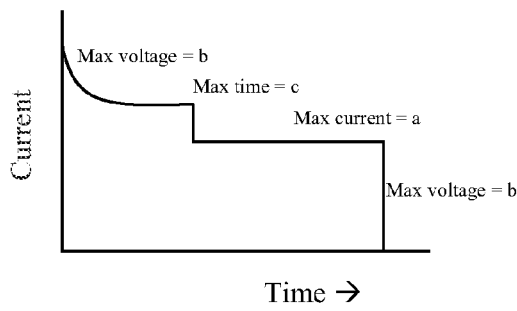
Figure 7:
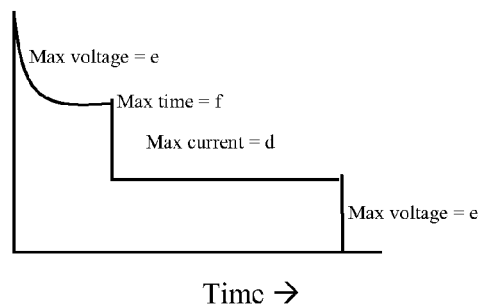

FIG. 7 shows four possible charge algorithms that could be used within the present invention. The graphs are to illustrate the idea, and are not on scale compared to each other.

In situation A, a charge algorithm is combined with a set of charge parameters. In this case, the charge algorithm describes that the battery current is limited to Max current, the Voltage is limited to Max Voltage and the time of the charging is limited to Max time. The parameters a, b and c are used in combination with this charge algorithm resulting in a current profile for the charging of the battery as shown in the figure of situation A: The battery charges at its maximum current until the maximum voltage is reached, then the current drops to maintain the maximum voltage until the time limit is reached and the charging is finished.

In situation B, the same charge algorithm is used, but with different charge parameters: d, e and f. The charging profile is different because of the different parameters.

In situation C, we show a different charging algorithm. In this case the same parameters as situation A are used a,b,c. The algorithm states that the battery is charged at max voltage until max time is reached, then the battery is charged at max current. Charging is finished when the max voltage is reached. Although the same parameter values are used for situation C, the charging profile is also different from situation A.

Situation D shows a charge profile for the algorithm of situation C with the parameters of situation B.

These examples illustrate how updating an algorithm according to the present invention can influence the charging profile which occurs under given conditions.

Figure 8:
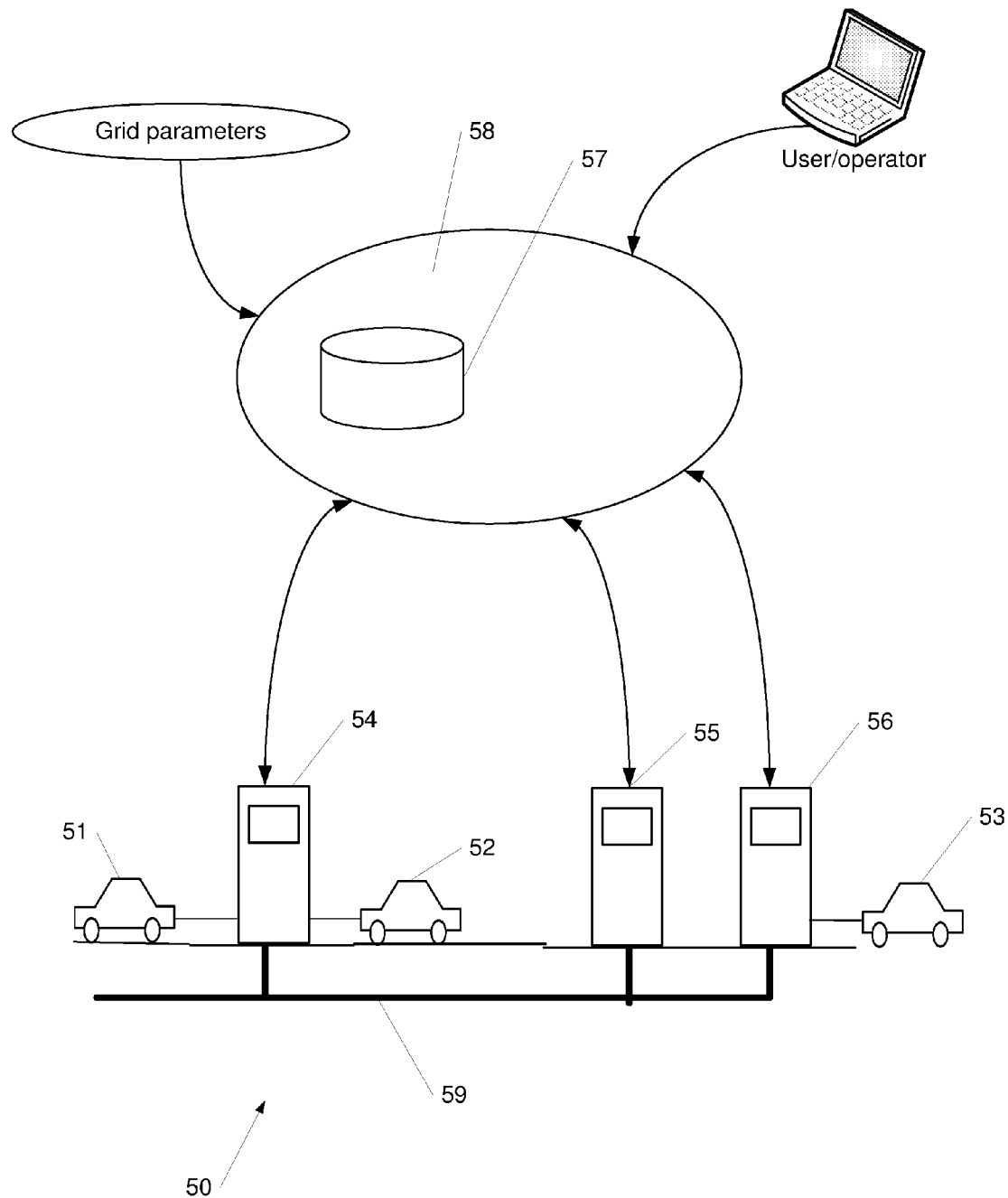
FIG. 8 shows an exemplary charging system for plural vehicles.

FIG. 8 shows an overview 50 of a system, wherein a plurality of vehicles 51-52 are connected to the same off-board charger 54. A specific charge algorithm is uploaded to the off-board charger 54 from a server 57 in a cloud 58 and executed, based on the priorities set for each of the power exchange ports by the user/operator terminal and the grid 59 power availability. For example it could be that at one moment there is not enough grid 59 power available for charging two vehicles at the highest charge rate, in that case a charge algorithm is executed which charges one of the vehicles fast and the other one slowly.

Figure 9:
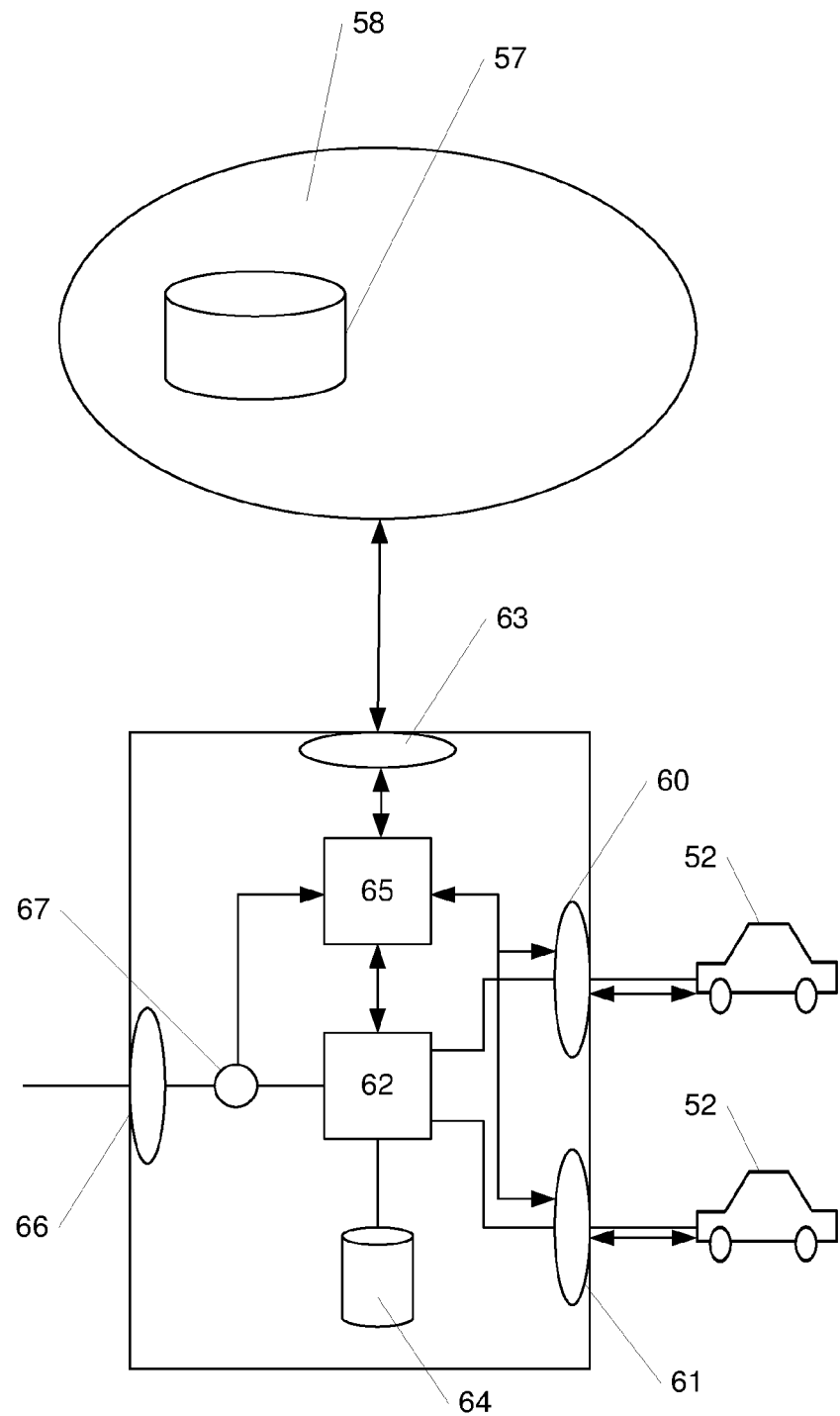
FIG. 9 shows an exemplary charger of FIG. 8.

FIG. 9 shows a detailed view of the charger 54 from FIG. 8 which may be used in the present invention. It consist of a plurality of secondary ports 60, 61 for delivering power to the vehicles and exchanging data with the vehicles, and AC/DC converter 62 for converting the AC power received by primary port 66 to DC. It comprises a controller 65 for uploading and executing the charge algorithms, the controller is in interaction with the servercloud 58 through a communication port 63 for receiving the charge algorithms. The communication port is further used for sending and receiving parameters. The controller may also be in communication with the vehicle via ports 60 and 61 for exchanging vehicle parameters or data. The off-board charger includes further a power meter 67 to measure the total power delivered on the secondary exchange ports. A local storage 64 may be used when the grid connection is not sufficient to deliver enough power on the secondary ports or when the operator wants to compensate for increase of energy prices. It is also possible to measure the temperature of a batterypack in the vehicle, and select a charge algorithm based on the measured temperature. If the temperature is too low, a charge algorithm is executed which applies a pulsed current to heat up the battery before it starts with fast charging.

The invention claimed is:

1. Method for charging an electric vehicle using an off-board charger, comprising:
  A. determining a suitable charge algorithm for charging the electric vehicle based on external parameters which includes at least one of: grid power availability, demand on other charging ports of the off-board charger, and price or demand on other charging ports of another charger, wherein
    the charge algorithm includes a procedure for controlling a charging operation of a charger, dependent on charge parameters including at least one of voltage, current, time and temperature;
  B. providing at least one of the off-board charger and the vehicle with the charge algorithm by uploading the charge algorithm into a controller of the vehicle, the controller being accessible by at least one of the vehicle and the off-board charger that charges the vehicle; and
  C. charging the electric vehicle according to the charge algorithm.

2. Method according to claim 1, wherein step B comprises:
  B1. providing the off-board charger with charge parameters for use with the charge algorithm.

3. Method according to claim 2, wherein step B comprises:
  B2. providing the charge parameters from a different location than the charge algorithm.

4. Method according to claim 1, wherein step B comprises:
  B3. reading the charge algorithm and/or charge parameters from a database in a data-network that includes the off-board charger.

5. Method according to claim 1, wherein step B comprises:
  B4. reading the charge algorithm and/or charge parameters from a database or memory in the vehicle to be charged.

6. Method according to claim 1, wherein step B comprises:
  B5. providing the charge algorithm as a computer readable script, and step C comprises:
  C1. charging the electric vehicle by executing the script by the off-board charger.

7. Method according to claim 1, wherein the charge algorithm is designed as a universal algorithm, which provokes extended functions.

8. Method according to claim 7, wherein the charge algorithm comprises:
  multiple loops, wherein the loops are stored on different locations, at least one of which is a central database and/or a memory located in the vehicle.

9. Method according to claim 1, wherein during step C the charge algorithm influences power delivery of a power converter which is part of the off-board charger.

10. Method according to claim 1, wherein during step C the charge algorithm influences power delivery of a power converter which is part of the vehicle.

11. An off-board charger for an electric vehicle, comprising:
  a memory storing an updatable charge algorithm set for charging a vehicle based on external parameters, the updateable charge algorithm set including a plurality of charge algorithms; and
  a vehicle charging device whose charging operation is controlled by at least one of the charge algorithms from the charge algorithm set.

12. Off-board charger according to claim 11, comprising:
  a controller for receiving and executing at least one of the charge algorithms as an executable script for the charging operation.

13. Off-board charger according to claim 11, comprising:
  a controller for receiving charge parameters for use in the at least one charge algorithm from a different source than the at least one charge algorithm.

14. Off-board charger according to claim 11 comprising:
  a power converter for power delivery during charging of the electric vehicle according to at least one of the charge algorithms which includes the power delivery.

15. System for charging electric vehicles, comprising:
  a data network that includes:
    a database for reading at least one of a vehicle charge algorithm and parameters from an off-board charger according to claim 11, which off-board charge is located at a charging station.

16. System according to claim 15, wherein the database is a central database, on a server that is part of the data network or at least one other network to which the off-board charger is configured to connect.

17. System according to claim 15, wherein the data network is a cloud network, and wherein the off-board charger comprises:
  a controller for uploading and executing the charge algorithms of the updatable charge algorithm set, wherein the controller is in interaction with a server of the cloud network through a communication port for receiving the charge algorithms.

18. System for charging electric vehicles, comprising:
  at least one user/operator interface for receiving user preferences;
  at least one server which holds a database of charge algorithms, and selects a charge algorithm to be provided to an off-board charger based on external parameters which include at least one of: grid power availability, or price or demand on other charging ports of a same or another off-board charger;
  at least one interface for uploading charge algorithms to a server database;

at least one off-board charger configured for receiving charge algorithms from the at least one server, the off-board charger including:
- a primary power exchange port for receiving power from a power source;
- at least one secondary power exchange port for exchanging power with an electric vehicle;
- at least one communication port for exchanging data or information with a vehicle;
- at least one power converter for converting power between a primary power exchange port and at least one secondary power exchange port;
- a controller for executing a charge algorithm received from the server and for controlling the power converter according to the executed charge algorithm;
- a communication port which is communicatively coupled to at least one server, for receiving the charge algorithms and delivering them to the controller; and
- a device for measuring a variable indicative of power delivered to the charger, and for generating a signal representing measured power, the device being configured to deliver the signal to the controller.

19. System according to claim 18, comprising:
an energy storage system coupled to the off-board charger for supplying power to the off-board charger when the power source is not sufficient.

* * * * *